UNITED STATES PATENT OFFICE.

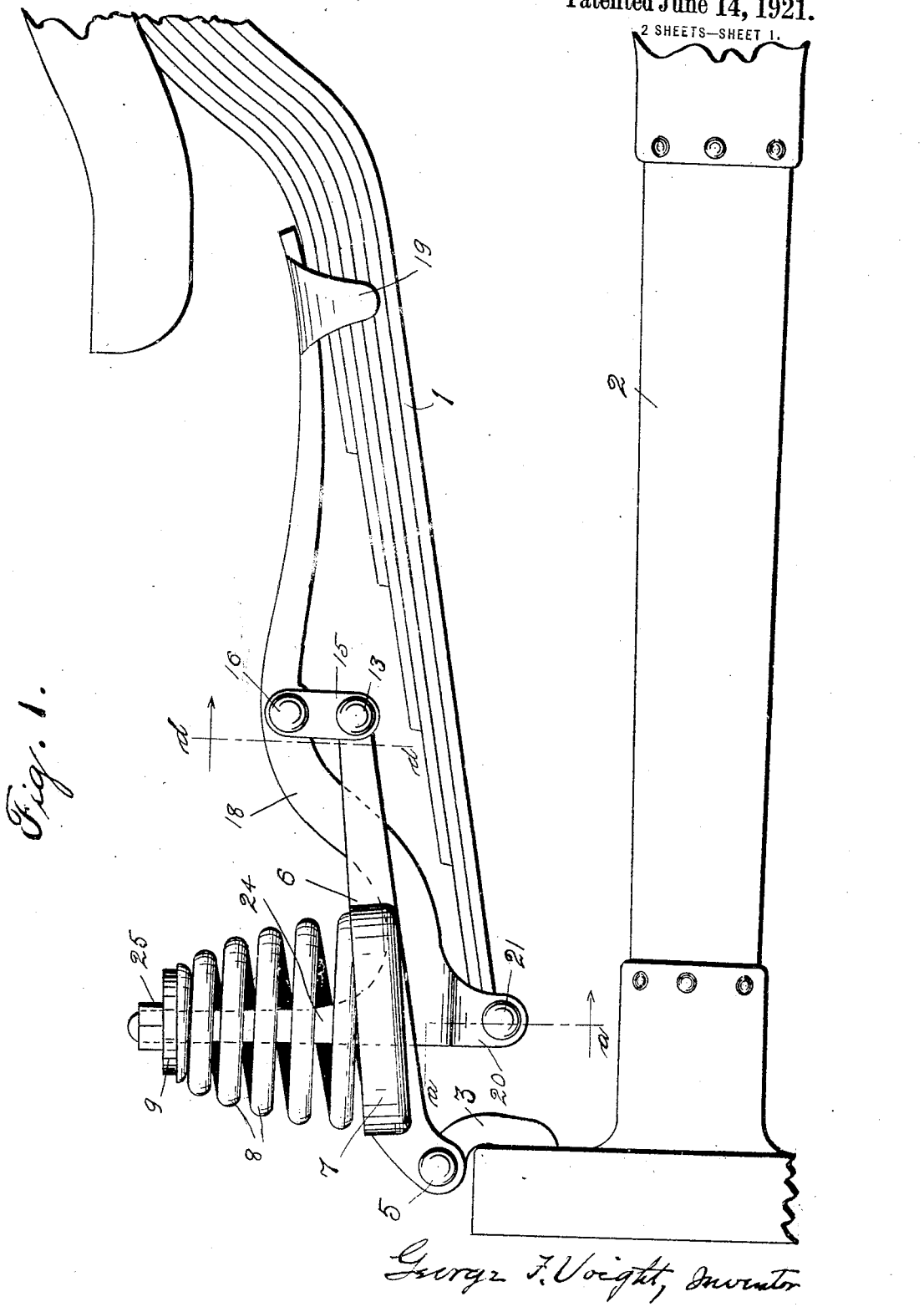

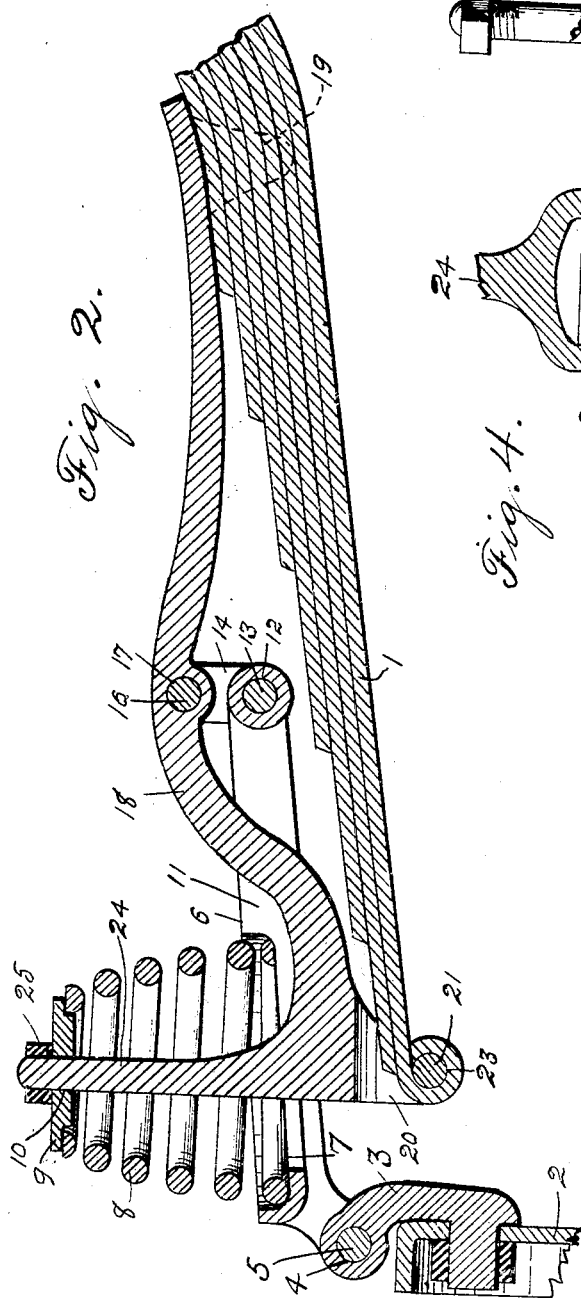
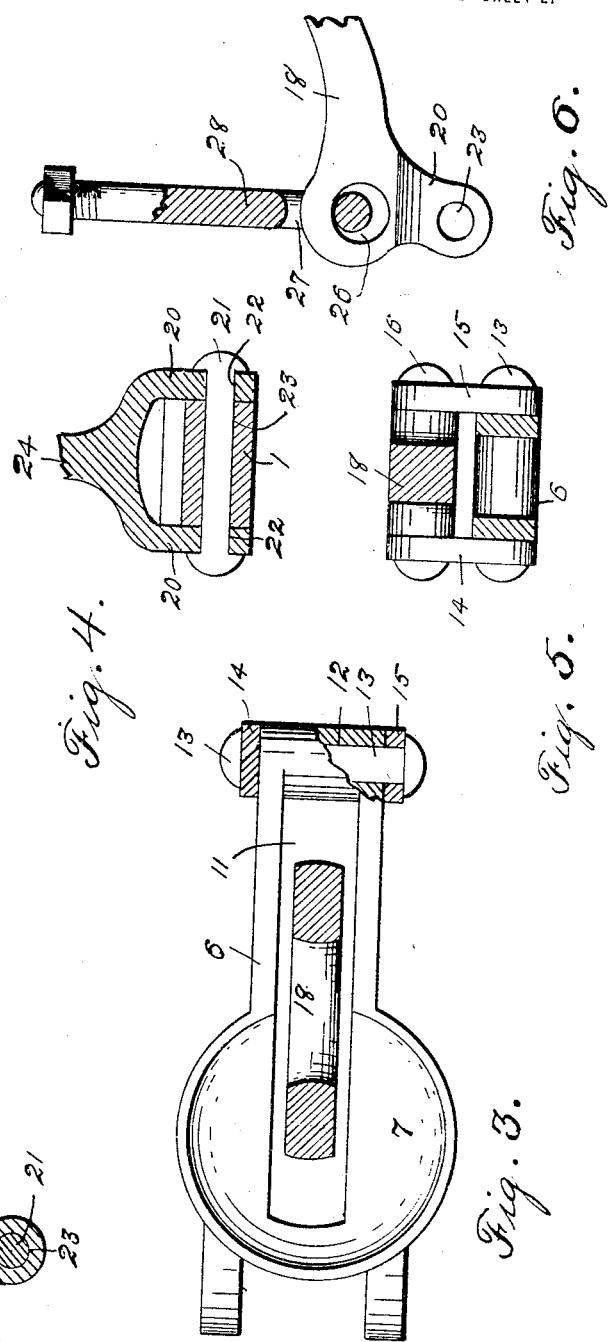

GEORGE F. VOIGHT, OF SAN FRANCISCO, CALIFORNIA, ASSIGNOR TO WALTER S. BURGESS, OF OAK PARK, ILLINOIS.

SHOCK-ABSORBER.

1,381,524.  Specification of Letters Patent.  Patented June 14, 1921.

Application filed April 28, 1919. Serial No. 293,119.

*To all whom it may concern:*

Be it known that I, GEORGE F. VOIGHT, a citizen of the United States, residing at San Francisco, in the county of San Francisco and State of California, have invented a new and useful Improvement in Shock-Absorbers, of which the following is a specification, reference being made therein to the accompanying drawings.

My invention relates to shock absorbers for road vehicles, and has for its primary object the provision of improved yielding means interposed between the ends of the vehicle's leaf springs and its axles.

Another object of the invention is to provide a shock absorber that will give maximum efficiency with a minimum cost of construction.

With the foregoing and other objects and purposes in view, which will appear as the description proceeds, the invention resides in the combination and arrangement of parts and in the details of construction hereinafter described and claimed, it being understood that changes in the exact embodiment of the invention as herein disclosed can be made within the scope of what is claimed without departing from the spirit of the invention.

Referring now to the drawings:

Figure 1 is a view in elevation of one of my absorbers installed on the rear left hand side of an automobile representing the Ford type of construction.

Fig. 2 is a vertical sectional view of the device, showing also fragmental portions of the automobile in section.

Fig. 3 is a plan view of that portion of the invention described as the primary lever, showing also fragments of other portions of the structure.

Fig. 4 is a section on line *a—a*, Fig. 1.

Fig. 5 is a view, partly in section, on line *d—d*, Fig. 1.

Fig. 6 shows a modification of a portion of the device.

Throughout the drawings, like numerals of reference indicate like parts.

(In order to facilitate describing the several parts and members constituting the present invention, and defining their positions relatively to the automobile, the terms "outer" and "outwardly" may from time to time be employed in the following description and claims, to indicate respectively—farthest away from—and—in a direction away from—the longitudinal axis of the vehicle, and the terms "inner" and "inwardly" to indicate respectively—nearest to—and—in a direction toward—said axis.)

In describing the detailed construction of the invention the reference numeral 1 designates a portion of vehicle leaf spring disposed over an axle 2 and extending in a general direction therewith.

To the axle 2 is rigidly secured a perch 3, which is provided at its upper end with a transverse opening 4, in which is rotatably fitted a pivot pin 5, one the free ends of which are mounted the outer bifurcated end of a primary lever 6. The arrangement is such that said outer end of the lever is thus pivotally supported by the axle 2.

Intermediate the ends of the lever 6, but nearer to its outer end than to its inner end, is a cup-shaped spring seat 7, faced upwardly, which supports the lower end of a coil compression spring 8, which carries upon its upper end a follower 9 provided with a central opening 10.

11 designates a slot extending vertically through the primary lever 6, from a point adjacent its inner end to a point well past the center of the spring seat 7.

The inner end of said primary lever is provided with a transverse opening 12, in which is rotatably fitted a pivot pin 13, to the free ends of which is secured the lower ends of a pair of links 14 and 15. To the upper ends of said links are secured the outer ends of a pivot pin 16, which is rotatably mounted in an opening 17 extending transversely through the intermediate section of a secondary lever 18, said intermediate section over-hanging said outer end of the primary lever 6.

The inner end of the secondary lever 18 is seated upon the vehicle's leaf spring at a considerable distance inwardly from its outer end, and is supported thereby. To limit transverse movement of the lever 18 relatively to the leaf spring, I provide it with a pair of laterally depending ears 19, to engage the sides of said spring.

The outer portion of the secondary lever 18 is bent downwardly and extends through the slot 11 of the primary lever, in which it is free to move both vertically and longitudinally of itself, and underlies at its outer end the coil spring 8. The lower end of said portion of this lever is bifurcated thereby forming a pair of spaced apart arms 20 disposed one on each side of the outer end of the leaf spring and secured thereto by means of a pin 21, which passes through openings 22 in the free ends of said arms and through the eye 23 in said outer end of the leaf spring.

The outer end of the secondary lever carries an upstanding stud 24, which may be made integral with said lever 18, as shown in Figs. 1 and 2, or may be loosely connected thereto as shown in Fig. 6, and hereafter described. Said stud extends up through the coil spring 8 and the opening 10 in the follower 9, and is threaded a suitable distance along its upper end for the reception of an adjusting nut 25, which may be turned in one direction to increase the tension of the compression spring and in the opposite direction to decrease said tension.

In the modified construction of the outer end of the secondary lever, illustrated in Fig. 6, I do not form it with an integral stud as shown in Figs. 1 and 2, but instead I provide this portion of the lever with an eye 26 engaging an eye 27 in the lower end of an eye-bolt 28. This form of construction permits the upper end of the eye-bolt to oscillate relatively to the lever.

It is preferable that the inner end of the secondary lever shall be approximately immovable relatively to its support, which may be the leaf spring or a part movable therewith in the action of the spring, and at a considerable distance inwardly from the outer end of the spring, as illustrated in Figs. 1 and 2 of the drawings.

I am aware that shock absorbers employing either the cantaliver or the compound-lever principle in conjunction with a coil compression spring for yieldingly supporting the outer end of the vehicle's leaf spring, have been in some form before proposed. To provide a shock absorber embodying both the cantaliver and compound lever principle in some form, operable in conjunction with a coil spring device that will be practical and efficient as a shock absorber and anti-recoil device and which will avoid objectionable features of prior proposed constructions, is one of the objects of the present invention. I accomplish this desired result by eliminating the usual shackle connection from the outer end of the leaf spring and connecting this end directly to the outer end of the lever, and permitting the leaf spring the necessary endwise movement relatively to the axle, I provide a shackle connection between the inner end of the primary lever and the secondary lever intermediate the ends of the latter.

It is obvious from the foregoing description and the drawings, that the outer end of the primary lever may be pivotally supported by the axle of the vehicle and its inner end relatively movably supported by the secondary lever; that the inner end of the secondary lever may be supported by a portion of the vehicle subject to rebound and its outer end yieldingly supported by a coiled compression spring supported by said primary lever, and that the outer end of the leaf spring may be supported by said outer yieldingly supported end of the secondary lever.

While I have shown my absorber as applied only to the left hand side of the rear end of an automobile, it is to be understood that the device is applicable to the right hand side as well as to the left, and to the front as well as to rear end of any machine.

I claim:

1. In a device of the character described, a primary lever adapted for a fixed pivotal support for its outer end, a secondary lever adapted to a relatively movable support for its inner end and adapted for connection to a main spring, and a shackle connection between the inner end of said primary lever and the secondary lever intermediate its ends.

2. In a device of the character described, a primary lever having a pivotal support for its outer end, a secondary lever having a relatively movable support for its inner end and adapted for connection to a main spring, a shackle connection between the inner end of said primary lever and the secondary lever intermediate its ends, and a connection between the outer end of said secondary lever and said primary lever.

3. In a device of the character described, a primary lever having a pivotal support for its outer end, a secondary lever having a relatively movable support for its inner end, a link connection between the inner end of the primary lever and said secondary lever, a connection between the outer end of the secondary lever and said primary lever, and a connection to adapt said secondary lever to the end of the vehicle spring.

4. In a device of the character described, a primary lever having a pivotal support for its outer end, a secondary lever having a relatively movable support for its inner end, a shackle connection between the inner end of the primary lever and said secondary lever intermediate its ends, a resilient connection between sections of said levers outwardly beyond said shackle connection, and a connection between one of said levers and one end of the vehicle's leaf spring.

5. In a device of the character described, a primary lever having its outer end pivotally supported, a secondary lever having a relatively movable support for its inner end, a shackle connection between sections of said levers, a resilient connection between other sections thereof, and a connection between the secondary lever and the outer end of the vehicle's leaf spring.

6. In a device of the character described, a primary lever having a pivotal support for its outer end, a secondary lever having a relatively movable support for its inner end, an inelastic shackle connection between the inner end of said primary lever and the secondary lever, an elastic connection between the outer end of said secondary lever and said primary lever, and a connection between the outer end of the vehicle's leaf spring and said outer end of the secondary lever.

7. In a device of the character described, means having a pair of spaced apart side members integral with its outer end, said members embracing the outer end of the vehicle's leaf spring and secured thereto, the inner end of said means engaging said leaf spring at a considerable distance inwardly from its outer end, and means whereby said first named means may be movably supported by the vehicle's axle outwardly beyond the leaf spring end.

8. In a device of the character described, a lever having its outer end provided with a horizontal opening, a pin disposed in said opening and extending through a registering horizontal opening in the outer end of the vehicle's leaf spring, the inner end of said lever seated upon the upper side of said spring a distance inwardly from its outer end, and means including a coil spring above said vehicle spring end whereby said lever may be movably supported by the vehicle's axle.

9. A shock absorber comprising a primary lever having a pivotal support for its outer end, a secondary lever having a relatively movable support for its inner end, a shackle connection between the inner end of said primary lever and the secondary lever intermediate its ends, a resilient connection between the outer end of the secondary lever and said primary lever intermediate its ends, and a connection between the outer end of said secondary lever and the outer end of the vehicle's leaf spring, the secondary lever being immovable longitudinally relatively to the axis of said leaf spring.

10. The combination with a vehicle having a leaf spring suspended above an axle and extending in a general direction therewith, of a primary lever having its outer end fulcrumed on said axle, a secondary lever having its outer end contiguous with the outer end of said leaf spring and secured thereto and its inner end supported by said spring at a point thereon a considerable distance inwardly from its said outer end, and an oscillatory link supported by the secondary lever intermediate its ends for supporting the inner end of the primary lever.

11. The combination with a vehicle having an axle and a leaf spring, of a primary lever having its outer end pivotally supported by said axle, a secondary lever having a pair of spaced apart arms integral with its outer end, said arms embracing the outer end of said leaf spring and secured thereto, the inner end of said lever supported by a portion of the vehicle subject to rebound, a connection including a coil spring between the outer end of the secondary lever and said primary lever intermediate its ends, and a shackle connection between the secondary lever intermediate its ends and the inner end of the primary lever.

12. The combination with a vehicle having an axle and a leaf spring, of a primary lever having its outer end fulcrumed upon said axle, a secondary lever having its inner end supported by a portion of the vehicle subject to rebound, a connection between the outer end of the secondary lever and the outer end of said leaf spring, a coil compression spring supported by said primary lever between its ends, a connection between said coil spring and said outer end of the secondary lever, and a link connection between the inner end of the primary lever and said secondary lever.

13. The combination with a vehicle having a leaf spring and an axle, of a secondary lever having its inner end supported by a portion of the vehicle subject to rebound and its outer end attached to the outer end of said leaf spring, a primary lever disposed in general axial alinement with said secondary lever and having its inner end underlying an intermediate upwardly bowed portion thereof, a shackle connection between said inner end and said portion, a pivotal connection between the outer end of the primary lever and said axle, a compression spring supported by said primary lever, and a connection between the outer end of the secondary lever and said spring.

14. The combination with a vehicle having an axle and a leaf spring disposed above the axle and extending in a general direction therewith, of a primary lever having its outer end fulcrumed on said axle, a secondary lever having its inner end supported by a portion of the vehicle subject to rebound and its outer end connected to the outer end of said leaf spring, and a resilient connection between said outer end of the secondary lever and the primary lever.

15. The combination with a vehicle having an axle and a leaf spring disposed above said axle and extending in a general direction therewith, of a lever pivotally supported at its outer end by said axle, a lever having its inner end supported by a portion of the vehicle movable relatively to said axle, the outer end of said last named lever being attached to the outer end of said leaf spring, a shackle connection between one section of said levers, and a resilient connection between other sections thereof.

16. The combination with a vehicle having an axle and a leaf spring disposed above the same and extending in a general direction therewith, of a primary lever having its outer end pivotally supported by said axle, a secondary lever having its inner end supported by said leaf spring intermediate its ends and its outer end connected to the outer end of said spring, a shackle connection between one section of said levers, and a resilient connection between another section thereof.

17. The combination with a vehicle having an axle and a leaf spring disposed above the same and extending in a general direction therewith, of a primary lever having its outer end pivotally supported by said axle, a secondary lever having its inner end supported by said leaf spring intermediate its ends and its outer end supporting the outer end of said spring, a shackle connection between the inner end of the primary lever and the secondary lever intermediate its end, a coil spring supported by said primary lever, and a connection between said outer end of the secondary lever and said coil spring.

18. The combination with a vehicle having an axle and a leaf spring disposed above said axle and extending in a general direction therewith, of a primary lever having its outer end pivotally supported by said axle, a secondary lever having its inner end seated upon said leaf spring at a distance inwardly from its outer end, the outer end of said secondary lever in engagement with the outer end of said leaf spring and secured thereto, the inner end of said primary lever disposed between intermediate sections of said secondary lever and leaf spring, a shackle connection between said inner end of the primary lever and said secondary lever intermediate the ends thereof, a coil compression spring seated upon the primary lever, and a connection between said spring and the outer end of the secondary lever whereby said spring may yieldingly support said end.

19. The combination with a vehicle having an axle and a leaf spring disposed above the axle and extending in a general direction therewith, of a primary lever having its outer end pivotally supported by said axle, a secondary lever having its inner end seated upon said leaf spring at a considerable distance inwardly from its outer end, the outer end of said secondary lever diverging in a pair of arms disposed one on each side of the outer end of said leaf spring and secured thereto, portions of said levers crossing each other, a link having its lower end pivoted to the inner end of said primary lever and its upper end pivoted to an intermediate portion of said secondary lever, a compression spring seated upon said primary lever intermediate its ends, and a connection between the compression spring and said outer end of the secondary lever for resiliently supporting it.

20. The combination with a vehicle having an axle and a leaf spring overhanging said axle and extending in a general direction therewith, of a primary lever having its outer end pivotally supported by said axle, a secondary lever having its intermediate portion disposed above said leaf spring and extending in a general direction therewith, the inner end of said secondary lever seated upon the leaf spring and supported thereby, the outer end of the secondary lever diverging in a pair of arms disposed one on each side of the outer end of the leaf spring and secured thereto, the inner end of the primary lever disposed below said intermediate portion of the secondary lever and supported thereby, a coil compression spring seated upon said primary lever adjacent its outer end, and means on the outer end of the secondary lever engaging the upper end of said coil spring.

21. The combination with a vehicle having an axle and a leaf spring extending in a general direction therewith, of a primary lever having its outer end pivotally supported by said axle, a secondary lever overhanging the outer section of said leaf spring and having its ends in engagement therewith, the inner end of the primary lever disposed between the intermediate portion of said secondary lever and said leaf spring, a shackle connection between said inner end and said intermediate portion of the secondary lever, means having its lower end secured to the outer end of the secondary lever and its upper end projecting above said primary lever, and a resilient connection between the upper end of said means and the primary lever.

22. The combination with a vehicle having an axle and a leaf spring disposed above said axle and extending in a general direction therewith, of a secondary lever disposed in general close relation with the outer section of said leaf spring and having its inner end seated thereon at a point a considerable distance inwardly from its outer end, the outer end of said lever approximately rigidly connected to said outer end of the leaf spring, a shackle having its upper end pivotally supported by said lever intermediate its ends, a primary lever having its inner end disposed below said secondary lever intermediate its ends and pivotally attached to the lower end of said shackle, a coil compression spring carried by said primary lever, means resiliently supported by the upper end of said compression spring, a connection between said means and said outer end of the secondary lever, and a pivotal connection between the outer end of said primary lever and said axle.

23. The combination with a vehicle having an axle and a leaf spring disposed above the axle and extending in a general direction therewith, of a secondary lever having an outer bifurcated end attached to the outer end of said leaf spring for supporting it and its inner end seated upon said leaf spring a distance inwardly from its outer end and supported thereby, means carried by said inner end of the lever engageable with the sides of said spring for preventing undue lateral movement of said end relatively to the spring, a primary lever having an intermediate section overhanging said outer end of the leaf spring and supporting upon its upper side a compression spring, a pivotal connection between the outer end of said primary lever and said axle at a distance outwardly from said outer end of the leaf spring, the inner end of said primary lever being disposed between an intermediate portion of said secondary lever and said leaf spring, a shackle connection between said inner end and said portion, and a connection between the outer end of said secondary lever and said compression spring for resiliently supporting it.

24. The combination with a vehicle having an axle and a leaf spring disposed above the same, of a secondary lever having an outer bifurcated end embracing the outer end of said leaf spring and secured thereto for supporting it, a support for the inner end of said lever, a primary lever having its outer end pivotally supported by said axle, a shackle connection between the inner end of said primary lever and said secondary lever intermediate its ends, a coil compression spring seated upon said primary lever, a slot in said primary lever extending from the upper to the lower sides thereof, and means movably disposed in said slot and extending from said outer end of the second lever to the upper end of said compression spring, the arrangement being such that said compression spring may yieldingly support said outer end of the secondary lever.

25. The combination with a vehicle having a transverse leaf spring overhanging an axle thereof, of a secondary lever having an intermediate upwardly bowed section overhanging a portion of said leaf spring, a support for the inner end of the lever, the outer end of the lever having a pair of spaced apart arms embracing the outer end of said leaf spring and secured thereto, a primary lever, a vertical slot therethrough, a portion of said secondary lever extending through said slot and movable relatively thereto, a coil compression spring carried by the primary lever, said compression adapted to yieldingly support said outer end of the secondary lever, a shackle connection between the inner end of the primary lever and said upwardly bowed portion of the secondary lever, and a pivotal connection between the outer end of the primary lever and said axle.

GEORGE F. VOIGHT.